(12) United States Patent
Berg et al.

(10) Patent No.: US 11,707,809 B2
(45) Date of Patent: Jul. 25, 2023

(54) METHOD AND APPARATUS FOR HIGH PRESSURE SEALING

(71) Applicant: Waters Technologies Corporation, Milford, MA (US)

(72) Inventors: Emily J. Berg, Allison Park, PA (US); Joshua A. Shreve, Acton, MA (US)

(73) Assignee: Waters Technologies Corporation, Milford, MA (US)

( * ) Notice: Subject to any disclaimer, the term of this patent is extended or adjusted under 35 U.S.C. 154(b) by 167 days.

(21) Appl. No.: 15/930,701

(22) Filed: May 13, 2020

(65) Prior Publication Data

US 2020/0361043 A1    Nov. 19, 2020

Related U.S. Application Data

(60) Provisional application No. 62/848,102, filed on May 15, 2019.

(51) Int. Cl.
    *B23P 19/02*       (2006.01)
    *F16B 37/04*       (2006.01)
    *F16J 15/02*       (2006.01)
    *F16J 15/06*       (2006.01)

(52) U.S. Cl.
    CPC .............. *B23P 19/02* (2013.01); *F16B 37/04* (2013.01); *F16J 15/022* (2013.01); *F16J 15/061* (2013.01)

(58) Field of Classification Search
    CPC ........ F16J 15/061; F16J 15/022; F16B 37/04; B23P 19/02
    See application file for complete search history.

(56) References Cited

U.S. PATENT DOCUMENTS

| | | | | |
|---|---|---|---|---|
| 1,009,303 | A | * 11/1911 | Hansen | F16J 15/061 277/630 |
| 3,826,463 | A | 7/1974 | Beauregard | |
| 4,295,766 | A | * 10/1981 | Shaw | F16B 37/14 411/113 |
| 4,829,660 | A | * 5/1989 | Everett | B23P 19/025 29/426.6 |
| 5,079,816 | A | * 1/1992 | Fisk | B25B 27/064 29/244 |
| 5,193,703 | A | * 3/1993 | Staats, III | G01N 1/34 220/240 |
| 5,239,740 | A | * 8/1993 | Ladouceur | F16B 37/048 29/432 |

(Continued)

FOREIGN PATENT DOCUMENTS

JP          09290332 A    * 11/1997  ............ B23P 19/001

OTHER PUBLICATIONS

International Search Report and Written Opinion issued in International Patent Application No. PCT/IB2020/054537 dated Oct. 8, 2020.

*Primary Examiner* — Eugene G Byrd
(74) *Attorney, Agent, or Firm* — Womble Bond Dickinson (US) LLP; Deborah M. Vernon; Mark DeLuca (57) ABSTRACT

The present technology generally relates to devices, systems and methods for providing robust sealing between surfaces in a pressurized system, such as a chromatography system. In particular, the devices, systems and methods relate to compliant and resilient parts that can be reused and/or reinstalled while providing a pressure tight sealing surface even within a high pressure environment (e.g., 1000 psi or greater).

14 Claims, 10 Drawing Sheets

(56) References Cited

U.S. PATENT DOCUMENTS

| | | | |
|---|---|---|---|
| 6,352,266 B1* | 3/2002 | Rigoli | G01N 30/6026 |
| | | | 210/353 |
| 9,562,879 B2* | 2/2017 | Hirmer | G01N 30/60 |
| 10,260,546 B2* | 4/2019 | Goldberg | F16B 13/08 |
| 11,143,336 B1* | 10/2021 | DuPont, Jr. | F16L 21/00 |
| 2008/0034567 A1* | 2/2008 | Galbreath | D06F 37/30 |
| | | | 29/428 |
| 2009/0285650 A1* | 11/2009 | Numazaki | H01M 8/04089 |
| | | | 411/103 |
| 2010/0282782 A1* | 11/2010 | Bevans | B05B 11/0032 |
| | | | 222/321.9 |
| 2011/0042139 A1* | 2/2011 | Duquette | F16L 9/147 |
| | | | 174/84 R |
| 2013/0133603 A1* | 5/2013 | Clark | F02M 61/14 |
| | | | 123/143 R |
| 2015/0014562 A1 | 1/2015 | Shreve et al. | |
| 2015/0136689 A1* | 5/2015 | Butters | B01D 63/066 |
| | | | 277/626 |
| 2016/0120573 A1* | 5/2016 | Teufel | A61B 17/3462 |
| | | | 277/625 |
| 2016/0316820 A1* | 11/2016 | Liu | A24F 40/485 |
| 2017/0130882 A1* | 5/2017 | Chen | F16L 23/22 |
| 2018/0142787 A1* | 5/2018 | Herzog | A61N 1/056 |
| 2019/0056028 A1* | 2/2019 | Spuhler | B01L 3/563 |
| 2021/0054933 A1* | 2/2021 | Schätzle | F16J 15/3268 |
| 2021/0123528 A1* | 4/2021 | Byrne | F16L 37/122 |

\* cited by examiner

METHOD AND APPARATUS FOR HIGH PRESSURE SEALING

RELATED APPLICATIONS

This Application claims priority to U.S. Provisional Patent Application 62/848,102, filed on May 15, 2019, the contents of which are hereby incorporated by reference in their entirety.

FIELD OF THE INVENTION

The present invention generally relates to devices, systems, and methods for providing robust sealing between surfaces in a pressurized system, such as for example, a chromatography system. In particular, the devices, systems, and methods relate to consumable parts that can be reused and/or reinstalled while still providing a pressure tight sealing surface.

BACKGROUND

Pressurized systems, such as chromatography systems, require the capability of controlling fluid flow and pressure there through. It is typical to see pressures greater than 500 psi (e.g., 1000 psi, 2000 psi, 5000 psi, etc.) To create adequate pressure sealing about moving parts, such as a needle in a back pressure regulator or injector to a column, consumable parts are used. To create the pressure seals, the consumables formed of compliant materials are secured in place using torque. While torque manipulates and secures the consumable into position to create a tight seal, torque can also have deleterious effects on the consumable. In particular, during installation of the consumable, the compliant consumable can be sheared causing scratches and impurities on the sealing surfaces. Depending on the degree of scratches and impurities, pressure control can be compromised to an unacceptable level. As a result, the number of installations and/or the amount of torque used is limited to ensure that the consumable can provide a pressure tight seal during use (e.g., 1000 psi, 2000 psi, etc.)

SUMMARY

Provided herein are devices and methods for providing a pressure tight seal between moving parts in a pressurized system. Embodiments of the present technology provide for multiple installations or positioning of sealing devices between the moving members without compromising pressure control performance.

One aspect of the present technology is directed to a method of installing a seat between a first surface and a second surface in a pressurized system. The method includes: (a) press-fitting the seat into a housing connectable to the first surface; (b) sliding a threaded nut over the housing; (c) crimping an end of the nut to the housing to provide a rotatably decoupled connection between the housing and the nut that allows the nut to freely rotate about the seat; and (d) securing the nut to the second surface. Due to the rotatably decoupled connection between the housing (containing the press-fitted seat) and nut, securement of the nut creates a pressure tight seal between the first and second surfaces within the pressurized system through rotation of the nut without applying torque to the seat.

Embodiments of this aspect of the present technology can include one or more of the following features. In certain embodiments, the first surface is an outlet of a back pressure regulator (BPR) and the second surface is a head of the BPR. The head includes a fluid inlet and a needle. In some embodiments, the seat has a body defining a fluid flow path extending substantially axially between an inlet exterior sealing surface and an outlet exterior sealing surface. The inlet exterior sealing surface is configured to have less elastic deformation under force (e.g., axial compression) generated by securement of the nut than the outlet exterior sealing surface. In embodiments of the method, at least a portion of the inlet exterior sealing surface of the seat is rounded.

Another aspect of the present technology is directed to a resilient seat for sealing surfaces in a pressurized system. The resilient seat includes a body defining a fluid flow path extending substantially axially between an inlet exterior sealing surface and an outlet exterior sealing surface. The body includes an outer wall surface positioned between the inlet exterior sealing surface and the outlet exterior sealing surface. The inlet exterior sealing surface includes a deformation member configured to deform outward from the inlet exterior sealing surface toward the outer wall surface and away from an interior of the fluid flow path when the resilient seat is axially compressed. The outlet exterior sealing surface includes a sealing member that is configured to deflect inward from the outlet exterior sealing surface toward the fluid flow path when the resilient seat is axially compressed.

Embodiments of this aspect of the present technology can include one or more of the following features. In some embodiments, the inlet exterior sealing surface is configured to have less elastic deformation when the resilient seat is axially compressed than the outlet exterior sealing surface. That is, the inlet exterior sealing surface can be made of a different material, contain a different shape or contour, and/or have a different thickness. In some embodiments, the deformation member on the inlet exterior sealing surface is a flange extending outward from the fluid flow path. The flange has a rounded exterior contour. In certain embodiments, the fluid flow path is sized and shaped to receive a needle for controlling pressure through the resilient seat. In additional embodiments, the interior walls defining the fluid flow path are configured to substantially match the profile of the needle. In some embodiments, the sealing member on the outlet exterior sealing surface is a face seal. In certain embodiments, the outlet exterior sealing surface is configured to have greater elastic deformation when the resilient seat is axially compressed than the inlet exterior sealing surface. In additional embodiments, a flange of material surrounds an outlet of the fluid flow path. The flange has an angled contour. In certain embodiments, the outlet exterior sealing surface comprises a flange extending from the body. Some embodiments feature one or more protrusions on side exterior surfaces of the body. The one or more protrusions are adapted to provide an interference fit with a housing. Certain embodiments include one or more visual indicators (e.g., notch, color stripe, etc.) to aid in the placement of the resilient seat in a housing. Some embodiments of the resilient seat are adapted for use in a back pressure regulator. That is, some embodiments of the resilient seat are secured within a back pressure regulator. In some embodiments, the material forming the resilient seat has a lower elastic modulus than a needle material (i.e., a material used to form the needle in the BPR). In certain embodiments, the material forming the resilient seat has a lower elastic modulus than a housing material. In some embodiments, the material forming the resilient seat has a lower elastic modulus than a head of the BPR.

The present technology has numerous advantages. For example, by eliminating the application of torque to the compliant seat during installation, the seat can be exposed to numerous installation and adjustment procedures. In addition, the seat of the present technology is less likely to be scratched or sheared, which results in better sealing and pressure control due to the lack of impurities and gaps. In general the seat and the methods of installation are more robust than conventional seats and methods. That is, the seat of the present technology is resilient. Further, some embodiments of the technology provide increased robustness and usability of the BPR as the components (e.g., seat) can be tailored to and installed using a method which decreases torque stress, shear and wear of the seat.

A further advantage of the present technology is found within the configuration of the compliant or resilient seat. In particular, embodiments of the seat of the present technology are configured to have a portion that makes a rigid face seal and a portion that intentionally deforms during installation. As a result, the seat of the present technology can provide better sealing and be used in extreme pressure environments (e.g., above 1000 psi, above 2000 psi, above 3000 psi above 4000 psi, above 5000 psi, above 6000 psi and greater). In addition, certain embodiments of the seat provide for a reduction of internal volume. That is, certain configurations or geometries of the seat of the present technology are tailored to the internal geometry of a portion of the pressurized systems (e.g., a portion within a back pressure regulator (BPR), or between two metallic surfaces in an injector). As a result, internal volume of systems can be minimized which typically improves performance due to a reduction of volume.

BRIEF DESCRIPTION OF THE DRAWINGS

The invention may be more fully understood from the following detailed description taken in conjunction with the accompanying drawings.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In general, aspects of the present technology are directed to improved sealing between two surfaces in a pressurized system (e.g., a system environment of over 1000 psi). In some embodiments, improvements are achieved by the removal of or minimization of torque applied to a compliant member positioned at a sealing joint. In some embodiments, the compliant member is a seat within a back pressure regulator. In other embodiments, the compliant member is a sealing ring situated between two metal faces in an injector to a chromatography column.

Certain embodiments feature a resilient seat that is configured to provide a flat face seal on a lower pressure surface in the pressurized system and a displacement seal on a higher pressure surface in the pressurized system. The resilient seat is axially compressible such that a pressure-tight seal can be made between the faces or ends of the seat and the first and second surfaces of the pressurized system without using torque on the seat. In certain embodiments, the displacement seal end of the seat is formed of a material and/or has a shape/contour that provides less elastic deformation during installation than the face seal end of the seat.

Figure 1:
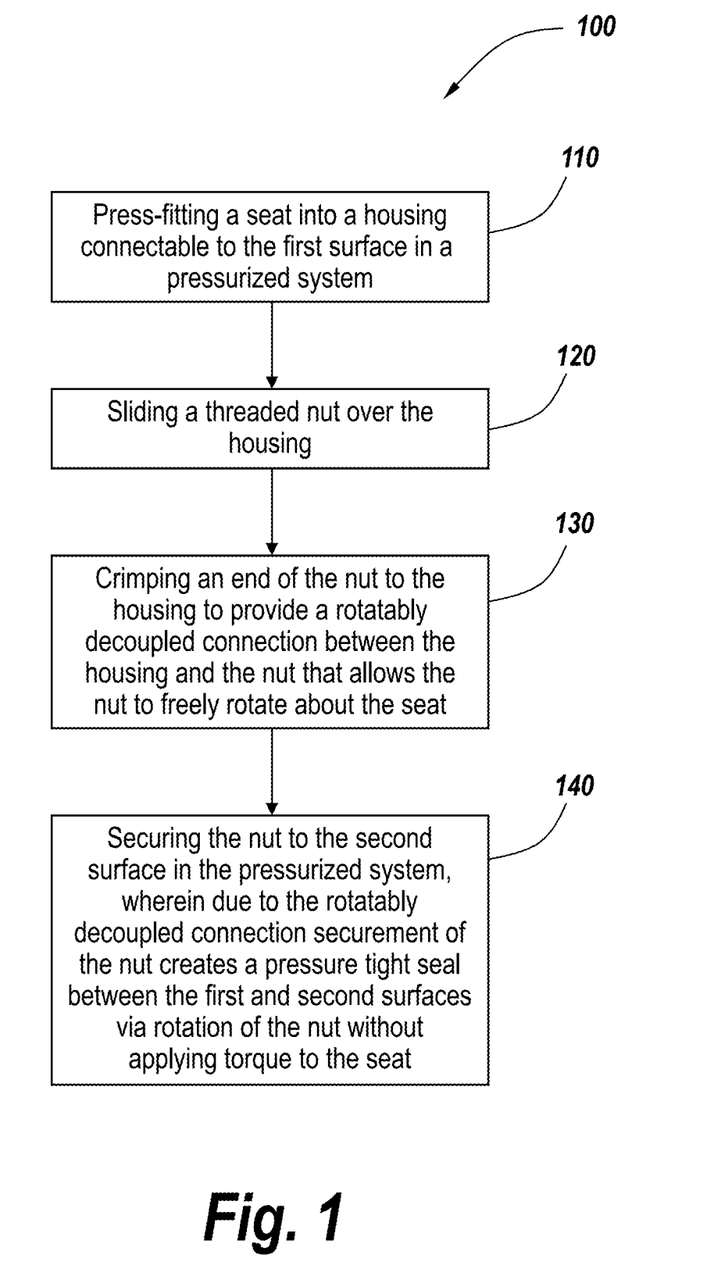
FIG. 1 illustrates an embodiment of a method of installing a seat between two surfaces in a pressurized system in accordance with an embodiment of the present technology.

Referring to FIG. 1, embodiments of the present technology are directed to methods of installing a seat between a first surface and a second surface in a pressurized system. Method 100 shown in FIG. 1 can be used to install a seat or other seal between two regions in a pressurized system, such as, for example, between high and low pressure regions in a back pressure regulator (BPR), or between two metal surfaces within a sample injector to a chromatography column. Because method 100 utilizes a compliant or press-fittable member that is decoupled from a housing as a sealing element, installation method 100 eliminates the use of torque on the compliant seal. That is, as the seat is decoupled from a securing structure (e.g., a nut or threaded grooves on the outside of the housing), the seat moves only in the axial direction when the nut is rotated and secured in position. As a result, at least a portion of method 100 can be repeated multiple times (e.g., step 140). The seal can be uninstalled and reinstalled numerous times without shearing or damaging the seal.

Method 100 includes four steps to install a seat between a first surface and a second surface in a pressurized system. In step 110, a seat or seal is press-fitted into a housing connectable to the first surface. Next in step 120, a threaded nut is slid over the housing. An end of the threaded nut is crimped to the housing to provide a rotatably decoupled connection between the housing and the nut that allows the nut to freely rotate about the seat in step 130. Finally, the threaded nut is secured to the second surface in step 140. Due to the rotatably decoupled connection, securement of the threaded nut to the second surface creates a pressure tight seal between the first and second surfaces through rotation of the nut. That is, no (or minimal) torque is applied to the seat during the rotation of the nut, because of the decoupled connection. The seat does not experience shear, but only axial compression to create a high pressure seal.

Figure 2:
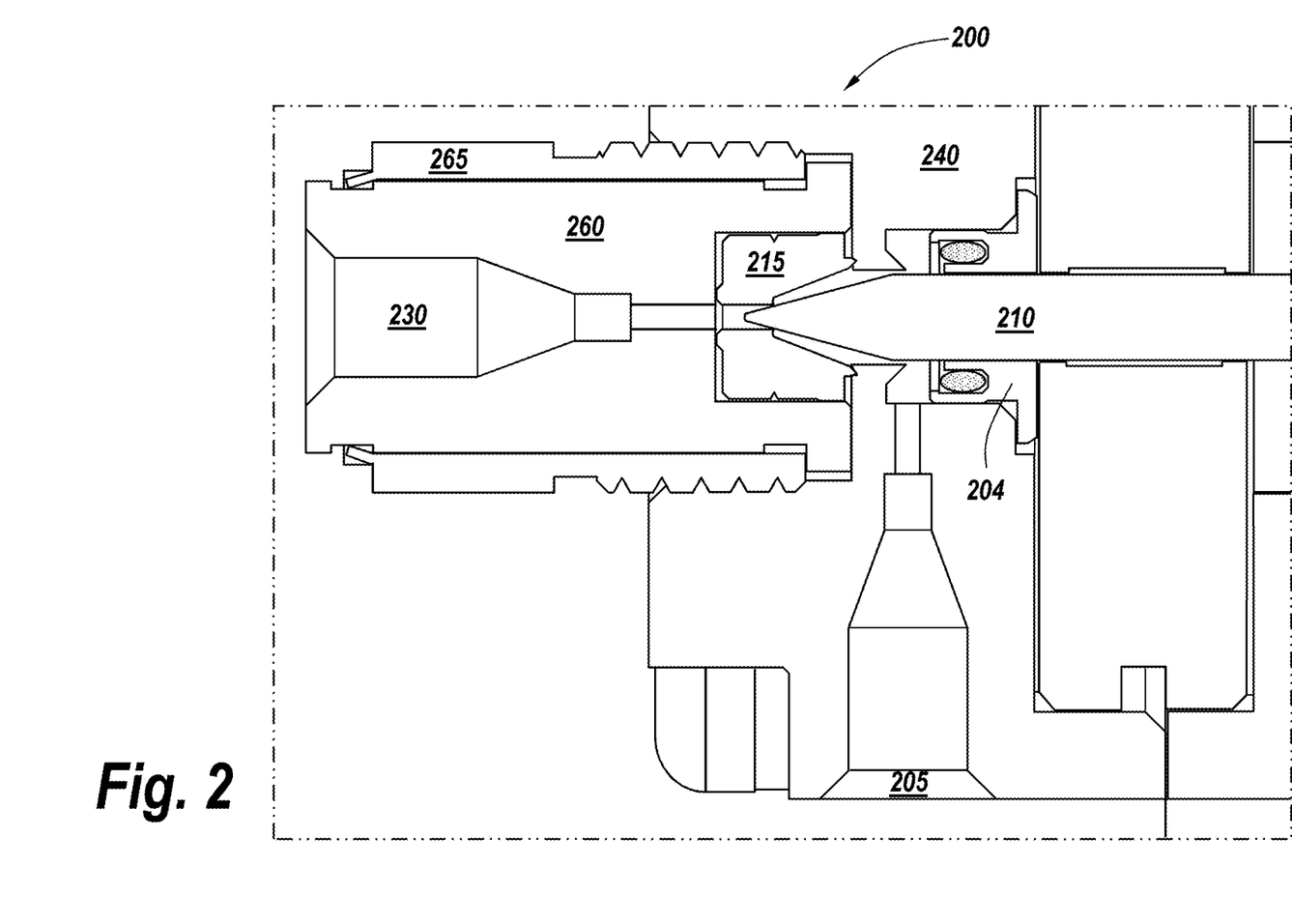
FIG. 2 schematically illustrates a needle-and-seat type back pressure regulator in accordance with an embodiment of the present technology.
Figure 3A:
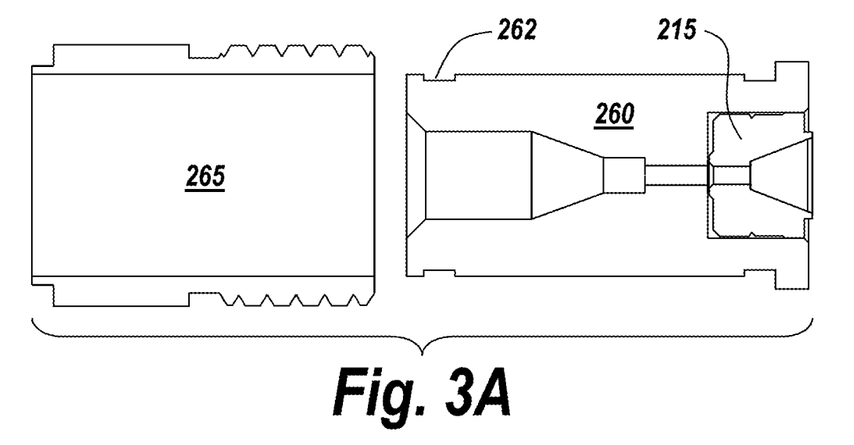
FIGS. 3A-C schematically illustrate a method of connecting a seat to a housing to provide a rotatably decoupled connection. In a first step, the seat is press-fit into a housing and a threaded nut slides over the housing (FIG. 3A). In the next step, the nut is aligned with external groves in the housing (FIG. 3B). In a final step, an end of the nut is crimped to the housing to provide free rotation of the nut about a seat that moves only in the axial direction when the nut is rotated (FIG. 3C).
Figure 3B:
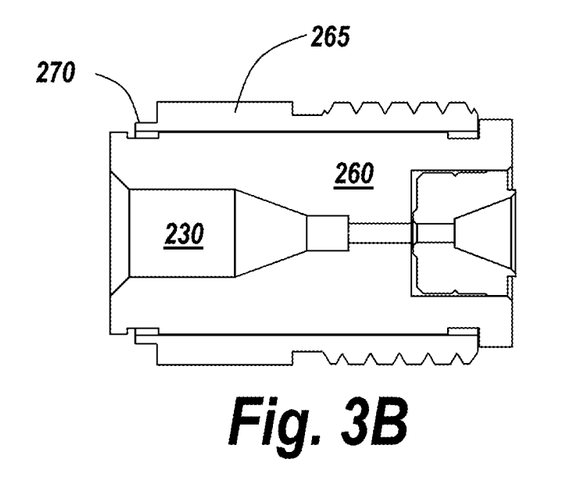
Figure 3C:
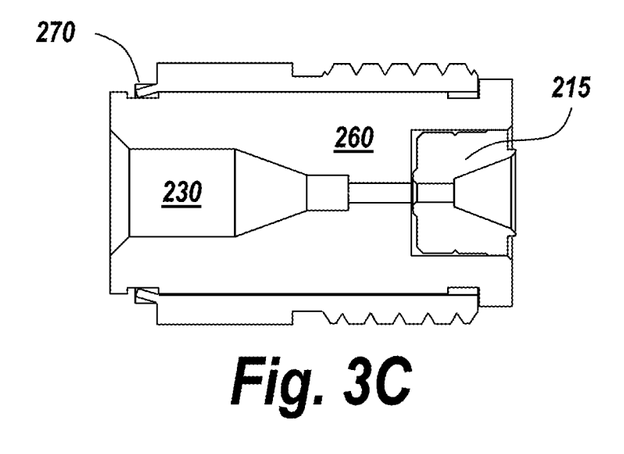

FIGS. 3A-C illustrate method 100 as applied to installing a resilient seat within a BPR. For context, FIG. 2 is provided as a reference of the components and regions of a BPR. It is noted that FIG. 2 illustrates embodiments of the present technology. That is, FIG. 2 illustrates a connection portion of a BPR 200 after the installation method 100 has been performed to create a pressure tight seal between first and second surfaces.

In particular, FIG. 2 illustrates an enlarged view of the connection between a head portion 240 (high pressure portion) and the outlet 230 (located in the low pressure portion). In general, the outlet 230 is located in a housing 260. Fluid flow within BPR 200 enters through inlet port 205, is controlled by movement of needle 210 positioned within seal 204 through seat 215 and passes out of the BPR through outlet 230. To create a pressure tight seal within regulator 200 and for maintenance thereof, nut 265 is rotatably secured (i.e., torqued) to the head 240 (e.g., a second surface in the BPR) until the housing 260 contacts the second surface on the head 240. In prior art devices and methods a seat between the high and low pressure portions is directly coupled to the nut or a threaded housing. When the outlet portion is secured into the head of a conventional device, the housing and seat rotate together generating high shear forces acting at the ends of seat. As a result, conventional seats degrade during installation.

Figure 4:
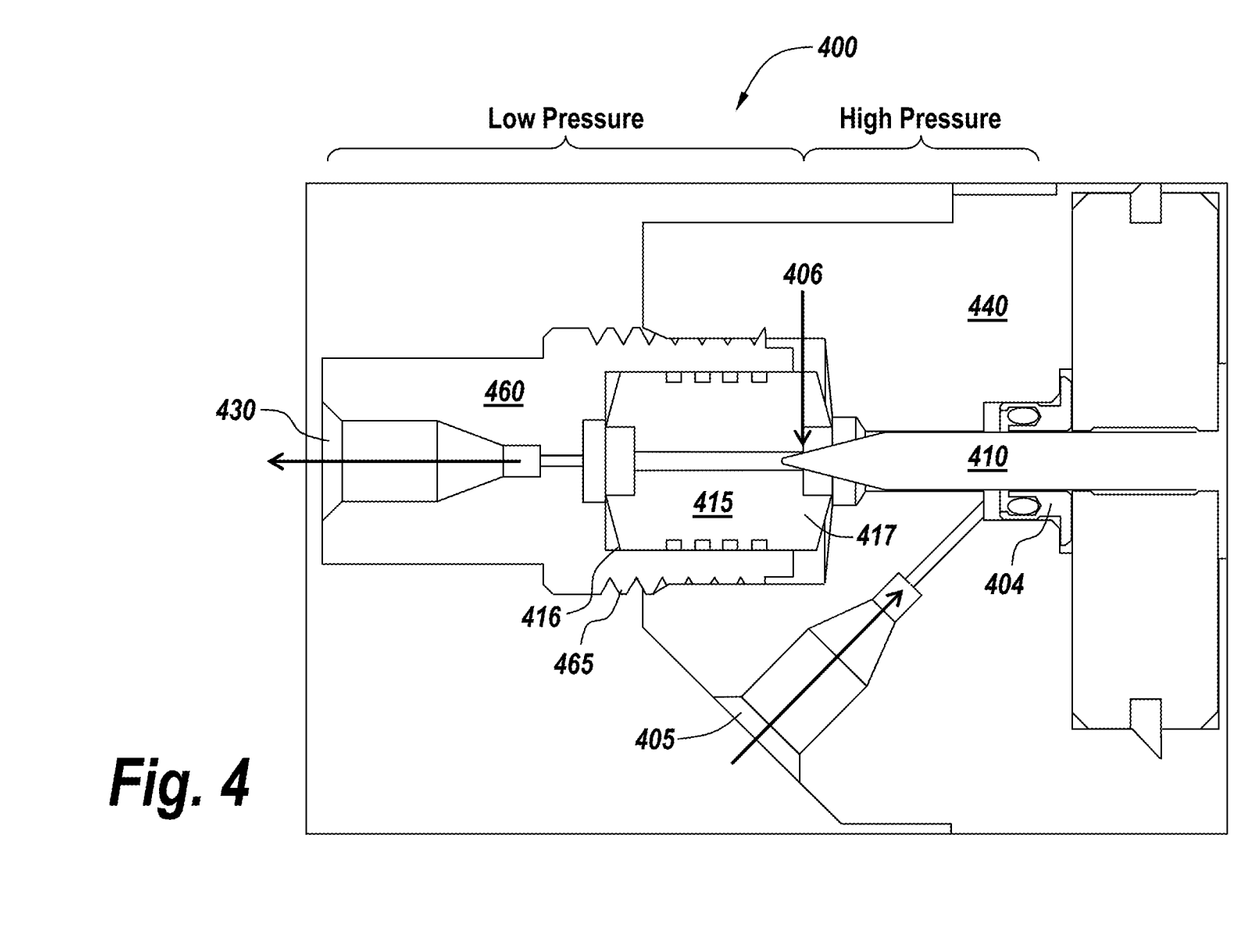
FIG. 4 schematically illustrates a conventional needle-and-seat type back pressure regulator. The seat used in this conventional BPR is within the prior art and is not in accordance with the present technology.

The seat 215 shown in FIG. 2 however is not coupled to the nut 265. That is, the seat 215 is rotatably decoupled from the nut 265 allowing for a more direct connection between the head 240 and the outlet 230 (e.g., minimizes internal volume) and prevents undesirable shearing of the seat during installation events. Compare FIG. 4, which illustrates a conventional BPR 400 connection using a seat 415 directly connected to housing 460, with FIG. 2. In FIG. 4, head 440 is secured directly to the threaded housing 460 to provide connection to the outlet 430 residing in the low pressure portion of the system. Fluid flows through BPR 400 through inlet 405. The flow of the fluid is controlled by the axial movement of needle 410 residing in seal 404 with tip 406 positioned in seat 415. Seat 415 resides within housing 460 that has a threaded exterior surface 465 that directly connects to head 440. As housing 460 is torqued into head 440 to create a seal, ends 416 and 417 of seat 415 are sheared.

In particular, the components of BPR 200 can be configured and installed using the following techniques to minimize internal volume as well as reduce shearing forces on seat 215, as compared to conventional seats installed in conventional BPR or other pressurized devices. A method of installation is shown in FIGS. 3A-C, in which seat 215 is first press-fit into housing 260. See seat 215 with press-fit connection to opening in housing 260. That is, seat 215 has an interference fit with the opening in housing 260. A threaded nut 265 is slid over the housing 260 as shown in FIG. 3A. To provide the rotatably decoupled connection between the housing and the nut, the nut is positioned over one or more exterior groves 262 in the housing 260 as shown in FIG. 3B, and the ends 270 of the nut 265 are crimped to the housing 260 as shown in FIG. 3C. This type of connection allows the nut 265 to freely rotate around the housing 260. As a result, when housing 260 including outlet 230 is installed in head portion 240 (see FIG. 2) it can be tightened/secured as needed through rotation without any shearing effects on seat 215. That is, while nut 265 is rotated and tightened to create a pressure seal with the head 240, seat 215 does not rotate, but rather moves axially toward needle 210. This installation and seat design allows for a more robust connection as the seat 215 does not experience shear. As a result, the housing 260 can be removed and reinstalled multiple times without destroying the seat 215. For example, minimal (if any) scratches and particulates are generated during installation as compared to seat 415 during installation. Both scratches and particulates can lead to degraded or poor sealing as gaps are created by the scratches (removed material) within the seat and by the particulates that pool and collect along sealing surfaces.

In general, the present technology is also directed to a resilient seat or seal that can provide improved pressure tight connection between two different pressure regions (e.g., high pressure portion and low pressure portion) within a system. Embodiments of the resilient seat or seal can be used together with the methods of the present technology. In addition, the resilient seat or seal can be used to improve sealing by tailoring the geometry, shape and/or materials of the seat/seal to address environmental demands. For example, as the seat/seal is typically located at an interface between high and lower pressure zones, each end of the seats and seals of the present technology are configured with its environmental placement in mind. That is, in an embodiment used in connection with a BPR, one end of the seat interacts with the tip of the needle 210 and is exposed to high pressures, whereas the opposing end of the seat interfaces with the outlet 230 and is on the low pressure side of the regulator. To address these demands and to eliminate excess fluid paths within the seat, the seat 215 has a tailored geometry shown in FIG. 5. A first end 520 of the seat 215 located at an end that interfaces with the needle (high pressure side) is formed to have a compliant surface, that is angled and sized to allow the needle 210 to be positioned within a range of axial positions therein. In certain embodiments, this portion of the seat's internal geometry includes surfaces 525 that closely match the profile of the needle 210 to provide a tight connection and to allow the flow path F-F to be tailored for a range of needle displacement through this first portion of the seat. The first end 520 is compliant and can deform especially during installation to allow for proper positioning of the seat 215 with the head portion 240. The internal geometry of the seat transitions at point 530 from a cone or angled volume to a more narrowly tailored straight cylinder to address the demands of the low pressure side. The opposing end 550 of the seat, which is the side of the seat that interfaces with the outlet 230 includes a small flange (e.g., a chamfer) 540 with a face seal. Using finite element analysis it was found that the small flange or chamfer 540 on end 550 assists in controlling deformation into the seat inner diameter during use. In this embodiment, the flange 540 has an angled (i.e., not rounded) contour and extends from the outlet exterior sealing surface 550. In other embodiments, flange 540 can be rounded. As the seat 215 is axially compressed, the angled contours of flange 540 deflect inward from the outlet exterior sealing surface 550 toward the fluid flow path (F-F) extending between surfaces 520 and 550.

Figure 6:
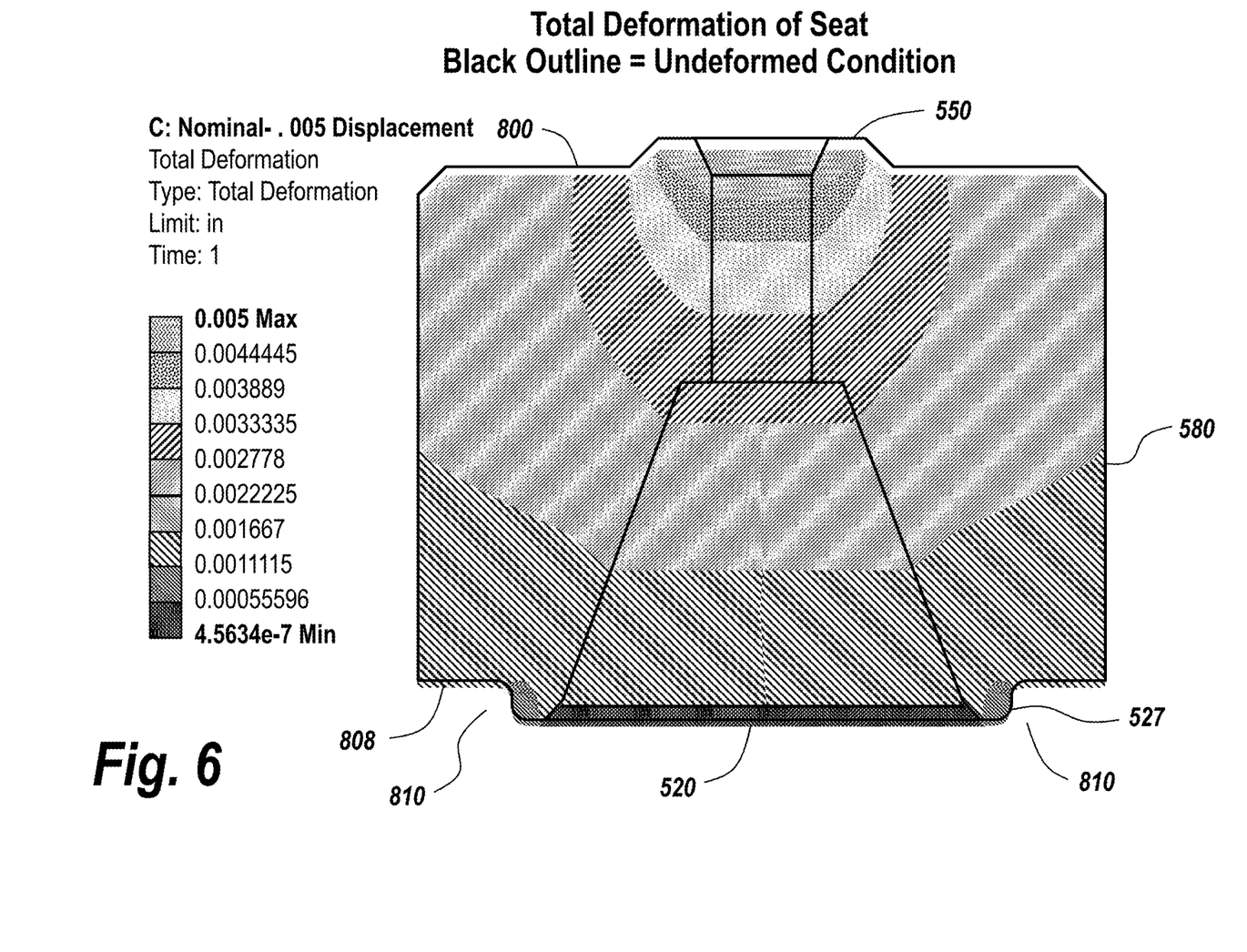
FIG. 6 schematically illustrates a finite element analysis of total deformation of a seat in accordance with the present technology. Outer black border 800 illustrates the undeformed condition.
Figure 7:
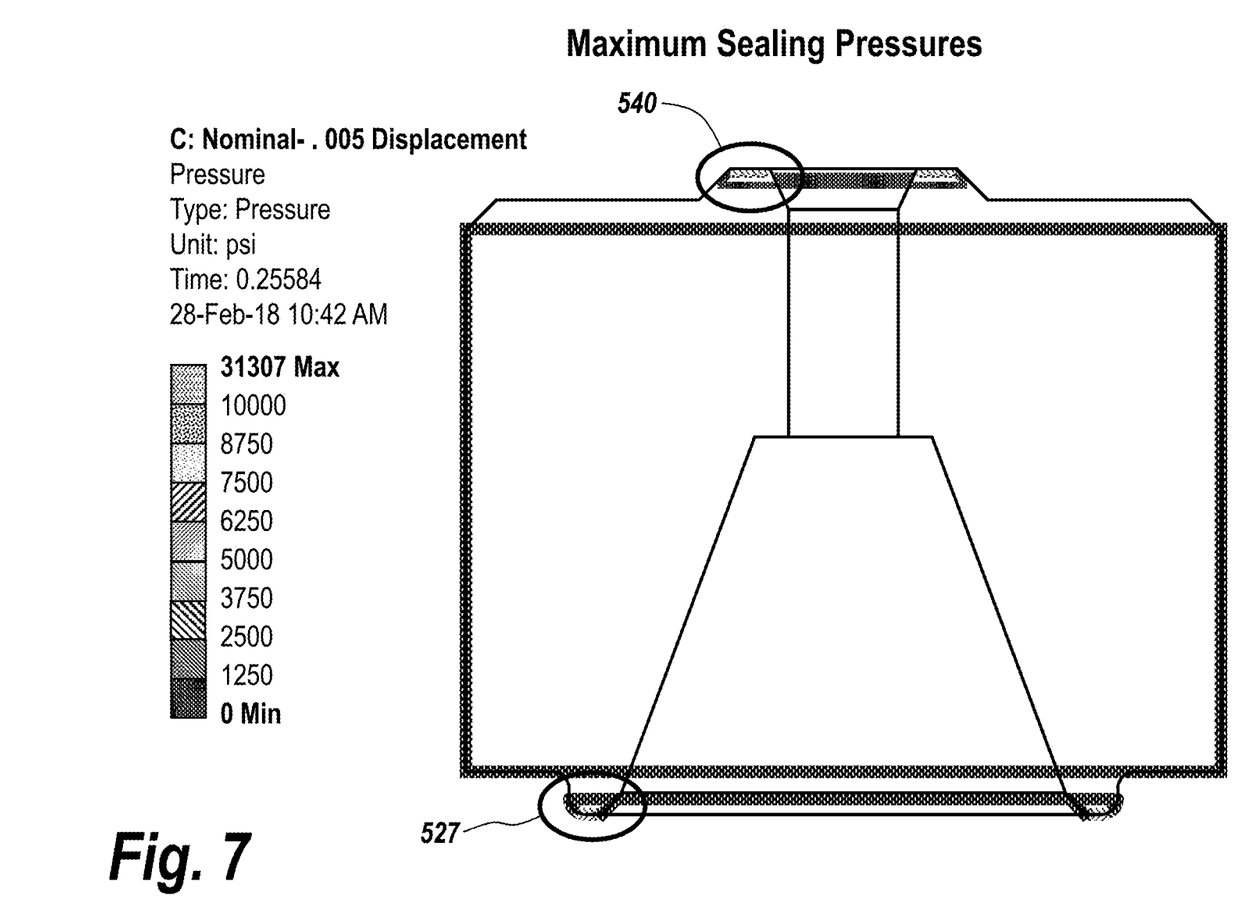
FIG. 7 schematically illustrates a finite element analysis of sealing pressures on inlet and outlet exterior surfaces of a seat in accordance with the present technology.

Utilizing finite element analysis, stress conditions around the ends of the seat 215 were studied and localized stress conditions were found to be in acceptable levels. FIG. 6 illustrates the results of deformation on the seat as a result of installation. As can be seen in FIG. 6, the outlet exterior sealing surface 550 which forms the top face seal experiences the most deformation. Without wishing to be bound by theory, it is believed that the shape or amount of material present on the outlet exterior surface 550 creates a rigid seal resulting in deformation that is coaxial to the load and does not deform into the fluid flow path of the seat. It was noted during FEA that varying the angle of the internal chamfer on this surface varied the degree of deformation into the flow path. The inlet exterior surface 520 shows a change of shape in response to the applied axial deformation. The outer black boundary 800 shows the undeformed condition, whereas the interior shaded portion illustrates the shape of the seat after application of the load. As can be seen in FIG. 6, surface 520 deforms such that material spills outside of its initial boundary. Without wishing to be bound by theory, it is believed that surface 520 changes shape as it is more flexible than surface 550 in that it lacks material (e.g., see gaps 810, creating rounded lip/flange 527). Flange 527 deforms outward towards surface 580. By varying the angle of the internal chamfer defining the opening to the fluid flow path, one can vary the degree of deformation outward. That is, in this embodiment, if the internal chamfer had a steep angle (e.g., vertical) there would be less deformation outward to edge 580 than a soft angle (e.g., more horizontal). FIG. 7 shows the results using FEA regarding sealing pressures. In particular, sealing pressures on the raised structure 540 on surface 550 and on the rounded lip 527 on surface 520 was studied. For the boundary conditions applied, the raised structure 540 and the lip 527 both were capable of sealing up to 31,307 psi.

In general, outlet exterior sealing surface 550 are configured to have greater elastic deformation when the seat is axially compressed than the interior exterior sealing surfaces 520. That is, the materials, shapes configuration, and/or thicknesses of features extending from outlet exterior sealing surface provide less resistance to deformation than on the inlet exterior sealing surface. For example, outlet exterior sealing surface 550 can include angled flange 540 that will deflect inward and will deform more than flange 525 extending from inlet exterior sealing surface 520. Flange 525 extends outward from the fluid flow path (see angled edge of fluid flow path F-F near end 520 that extends outward toward side exterior surfaces 580). In addition to the outward flare, flange 525 includes a rounded exterior contour 527. The rounded exterior contour 527 is easily deformable and will deform outward from the inlet exterior sealing surface 520 toward the outer was surface 580 and away from an interior of the fluid flow path F-F when the seat 215 is axially compressed. While seat 215 shown in FIG. 5, has a rounded contour flange extending from its inlet exterior surface to provide the seat with a deformation member, other structures or materials can be used in addition or in replacement of the rounded contour flange. For example, a different material could be used on a portion of surface 520 corresponding to the location of 527 that is more deformable than an interior portion of surface 520, rather than include the rounded counter. Additionally or alternatively, a different sized rounded flange or protrusion extending from surface 520 can be used as the deformation member. In fact, any deformation member that is configured to deform outward toward outer or side exterior surface 580 and away from the interior fluid flow path F-F can be used.

Figure 5:
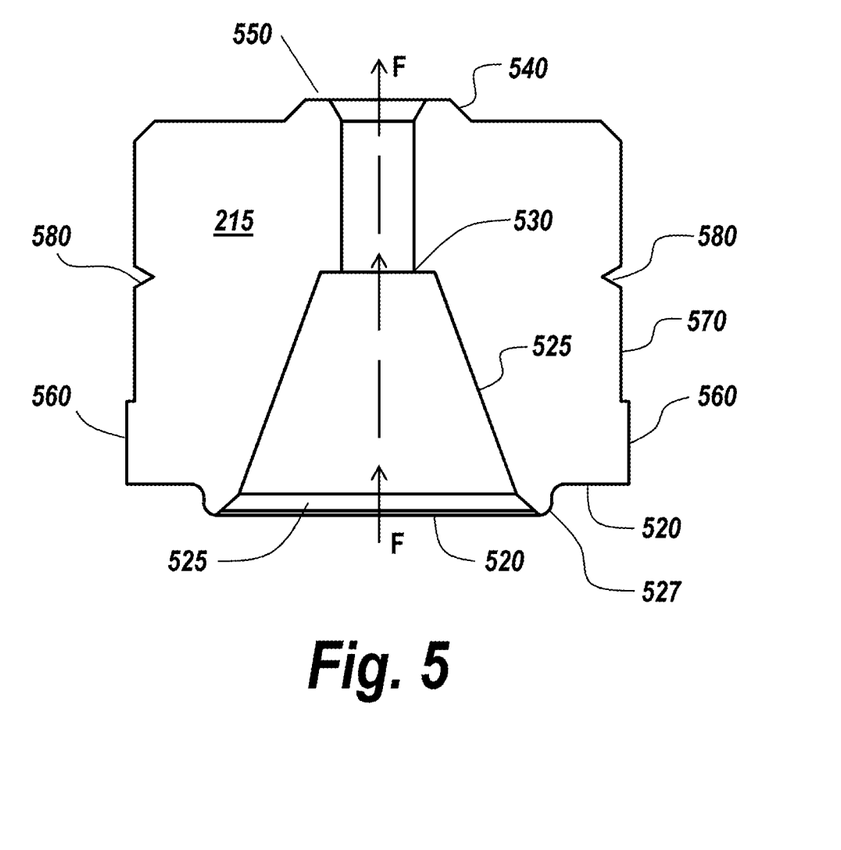
FIG. 5 is a cross-sectional view of an embodiment of a resilient seat in accordance with the present technology. The seat of FIG. 5 has a surface 550 that creates a face seal with an adjacent component and a deformable surface 520 that has less elastic deformation than surface 550 when the seat is axially compressed. The seat of FIG. 5 also has a geometry designed for reduced internal fluid volume.

In addition to deformation and sealing features, the seat 215 of the present technology can include other structures or features on exterior surfaces. For example, seat 215 in FIG. 5 includes protrusions 560 on its side exterior surfaces 570. Protrusions 560 extend radially and improve the interference fit of seat 215 in holder 260. In addition to protrusions, the side exterior surfaces can include visual aids to help with the placement of the seat within a holder. In FIG. 5, seat 215 includes visual aids 580 (e.g., notches) that in this embodiment correspond to the location of the transition 530. The visual aids 580 in FIG. 5 indicate end that is inserted into the housing (e.g., aid the user in proper placement of the seat 215). While the embodiment shown in FIG. 5 uses notches or cut-out groves, other visual aids are possible. For example, a color change or a band or stripe of color could be used instead of the notches. In addition, other patterns besides notches could be used to visually mark a desired orientation or position of the seat.

Seat 215 can be made of a single material, a graded material, or multiple materials. That is seat 215 can be formed from a unitary piece (e.g., a single material, or a graded material) or it can be a two piece structure, where each piece is formed from a different material and is bonded together. In the embodiment shown in FIG. 5, seat 215 is a unitary piece formed of a single compliant material, such as a polyimide-based plastic (e.g., Vespel). The differences in elastic deformation between the inlet and outlet exterior sealing surfaces are created by the structures and features on those surfaces. In other embodiments, the differences in elastic deformation (the inlet surface 520 has less elastic deformation than the outlet 550) by grading the material. That is additives can be incorporated into the material forming the seat such that surface 520 has less elastic deformation property than surface 550. In other embodiments, not shown, seat 215 could be made from two different materials bonded together (such as at location of transition 530) to provide the difference in elastic deformation property between surfaces 520 and 550. The material or materials forming seat 215 are typically compliant materials that are resilient under axial compression. The seat 215 when installed will be compressed between metallic or rigid surfaces defining high and low pressure regions. In addition, in embodiments within a BPR, the seat will be exposed to the needle 210 moving in, out, and along flow path F-F with its tip possibly hitting transition 530 to control the flow of fluid therethrough. To provide resilience under these operating conditions, the material forming the resilient seat will typically have a lower elastic modulus than a material forming the needle. In addition, to ensure resilience of the seat 215 during multiple installation events, the material used to form the seat will have a lower elastic modulus than a housing material as well as a lower elastic modulus than the material forming the head of a back pressure regulator.

In general, the seats/seals and methods of installation within a pressurized system described herein provide enhanced pressure sealing capabilities. As a result, the present technology can be used in high pressure systems (e.g., in connection with 1000 psi or more) robustly. This advantage is particularly attractive for use within a BPR used to control pressure changes in a chromatography system. The seats of the present technology also increase or enhance performance of pressure control by helping to eliminating unswept volume through the reduction of internal volume. Unswept volumes are portions accessible to fluid flow, but not within the primary solvent flow path used in the chromatographic separation. Portions of the solvent flow may diffuse into and out of the unswept volume at an irregular rate, resulting in band-broadening. Band broadening reduces the quality of a separation and my result in broad and potentially overlapping chromatogram peaks. In the present technology, the seat within the BPR can be tailored to reduce internal volume within the BPR. For example, at least a portion the fluid flow path F-F extending through the seat can be closely tailored to the exterior shape of the needle within the BPR. Another portion of the fluid flow path F-F (the portion above transition 530) is sized to provide a narrower restriction which can also reduce the length of the fluid path, thereby eliminating internal volume. Examples 1 and 2 below illustrate improved performance of a BPR utilizing a seat in accordance with the present technology.

Example 1

Figure 8:
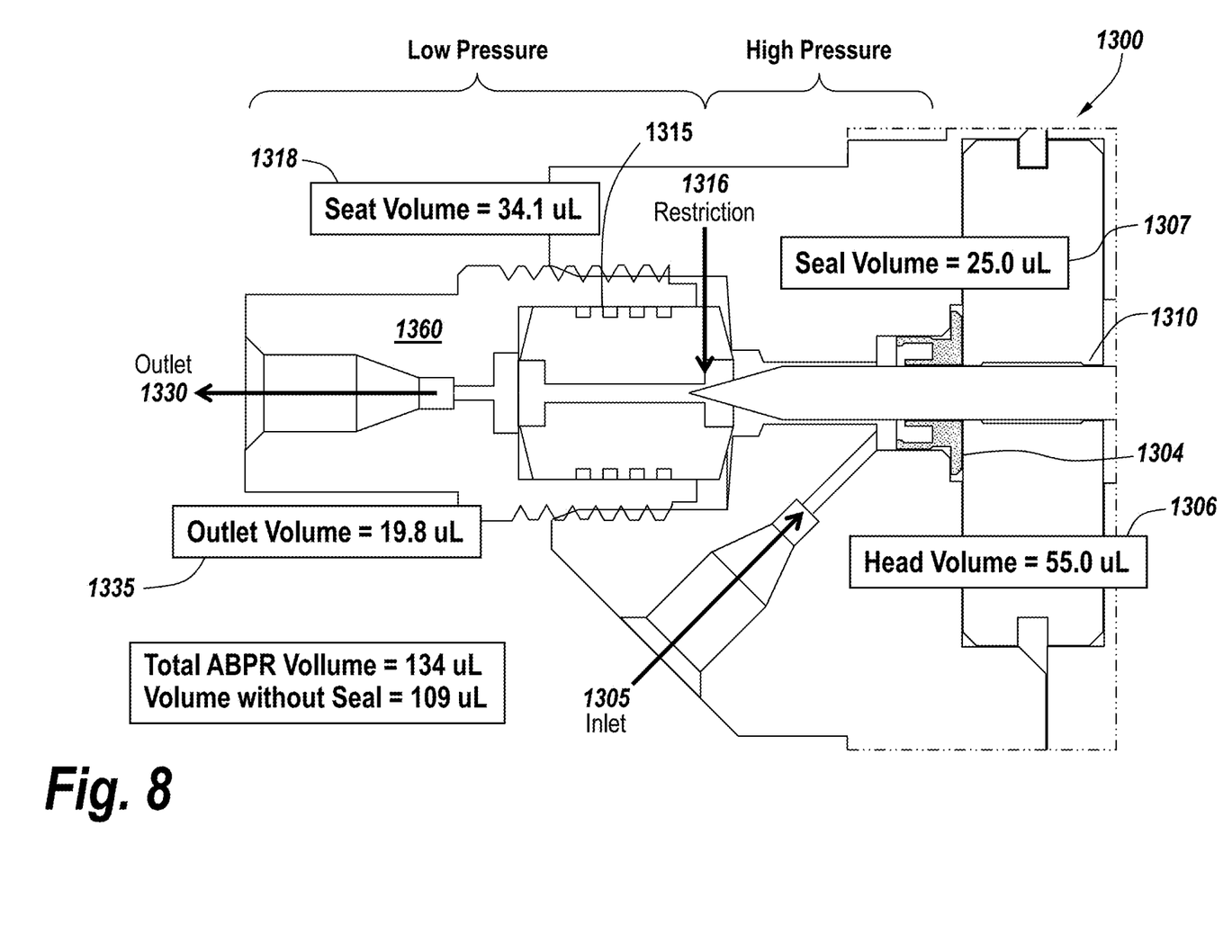
FIG. 8 schematically illustrates a needle-and-seat type back pressure regulator that is not configured to reduce internal volume.

FIG. 8 shows back pressure regulator 1300 which has not been configured for reduced internal volume (i.e., standard commercial stock BPR). Back pressure regulator 1300 includes an inlet 1305, seal 1304, needle 1310, seat 1315, and outlet 1330. Needle 1310 and seat 1315 define restriction 1316 at which needle 1310 would meet seat 1315 at one extreme of the range of motion of needle 1310. Back pressure regulator 1300 also includes internal volumes that may be occupied by the mobile phase flowstream when the back pressure regulator is in use in a chromatographic separation. Head volume 1306 (55.0 μL) includes the portions of the flowstream from the inlet up to seal 1304, along needle 1310 and up to seat 1315. Seal volume 1307 (25.0 μL) is proximate seal 1304. Seat volume 1318 (34.1 μL) is within seat 1315. Outlet volume 1335 (19.8.1 μL) is downstream of seat 1315 at outlet 1330. The total internal volume of these components is 134 μL (109 μL excluding seal volume 1307.)

Figure 9:
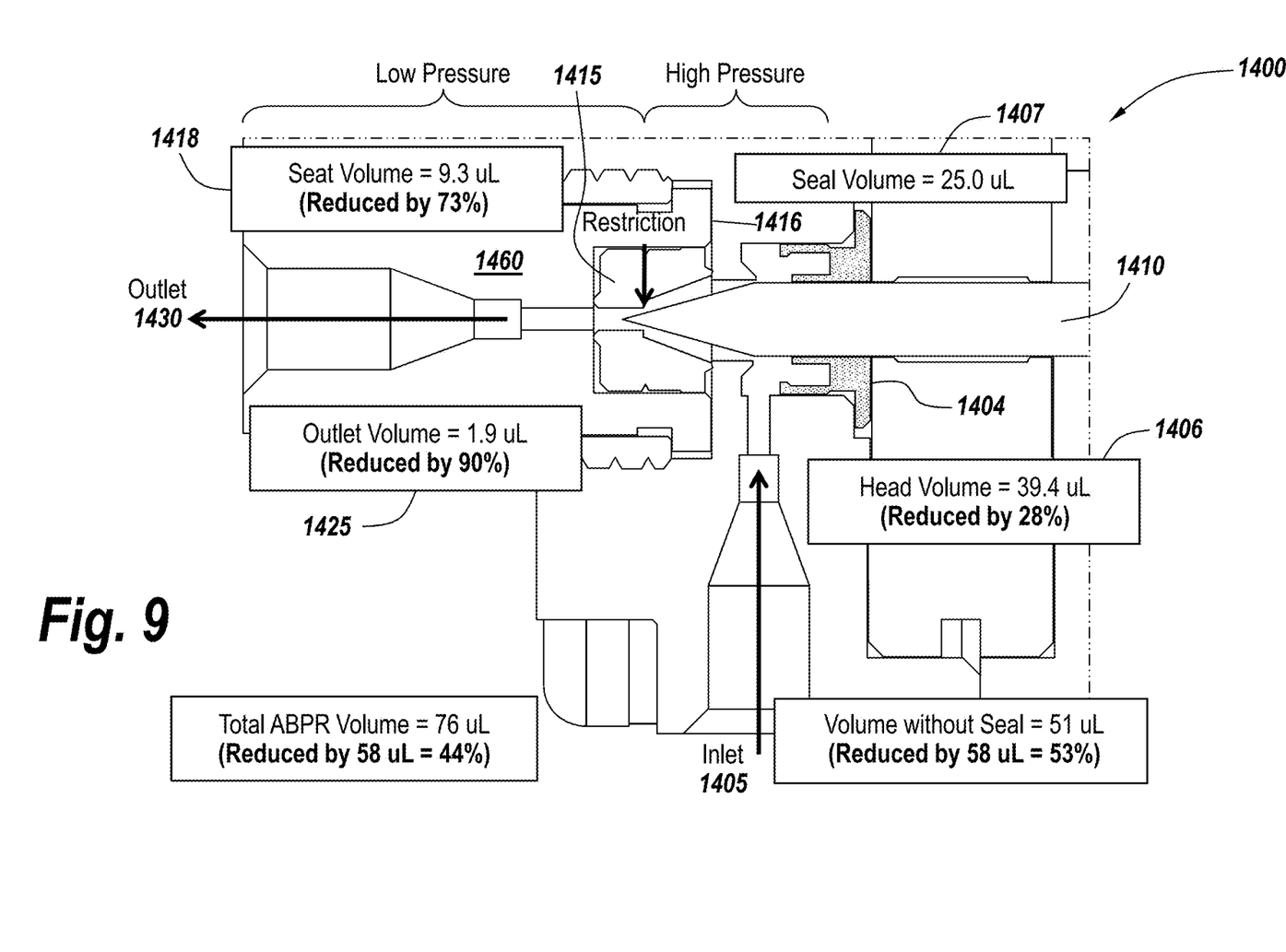
FIG. 9 schematically illustrates a needle-and-seat type back pressure regulator that is configured to reduce internal volume.

FIG. 9 shows back pressure regulator 1400, which has been configured for reduced internal volume. Back pressure regulator 1400 contains the same basic components: Back pressure regulator 1400 includes an inlet 1405, seal 1404, needle 1410, seat 1415, and outlet 1430. Needle 1410 and seat 1415 define restriction 1416 at which needle 1410 would meet seat 1415 at one extreme of the range of motion of needle 1410. Back pressure regulator 1400 also includes internal volumes that may be occupied by the mobile phase flowstream when the back pressure regulator is in use in a chromatographic separation. Head volume 1406 includes the portions of the flowstream from the inlet up to seal 1404, along needle 1410 and up to seat 1415. Seal volume 1407 is proximate seal 1404. Seat volume 1418 is within seat 1415. Outlet volume 1425 is downstream of seat 1415 at outlet 1430.

Back pressure regulator 1400 is configured for reduced internal volume. That is, the relationships and positioning of various BPR components have been tailored to reduce internal volume (e.g., to minimize unswept volume). It should be appreciated that while the BPR shown in FIG. 9 has been tailored in multiple ways, a BPR does not need to be tailored in every way shown in FIG. 9 to achieve at least some advantage over commercially available BPRs. Head volume 1406 has been reduced to 39.4 μL (28% reduction) by locating inlet 1405 proximate seat 1415 and providing inlet 1405 perpendicular to needle 1410 reducing the length of the flowpath to needle 1410. Seal 1404 is positioned closer to seat 1415. Seal volume 1407 is not reduced in the back pressure regulator 1400 as depicted. Seat volume 1418 has been reduced to 9.3 μL (73% reduction) by reducing the length of seat 1415, and shaping seat 1415 so that its interior volume more closely approximates the shape of needle 1410. Restriction 1416 is configured to define a sharp point at the interface of conical and cylindrical portions of seat 1415. Outlet volume 1430 has been reduced to 1.9 μL (90% reduction) by connecting outlet 1430 directly to the flowpath from seat 1415. Comparison of FIG. 8 to FIG. 9 also provides an example of reducing volume by reducing cross-sectional area at interfaces between BPR components. Seat volume 1418 and outlet volume 1425 are each reduced by minimizing the cross-sectional area at the interface of outlet 1430 and seat 1415 is configured such that it is not larger than the size of the flowpath. The total internal volume of back pressure regulator 1400 is 76 μL, a 44% reduction as compared to back pressure regulator 1300, or, excluding seal volume, 51 μL (53% reduction). In general, interfaces between components in unmodified back pressure regulators may have a larger area than the flowpath within the components and reducing these areas may reduce the volume within the back pressure regulator.

Example 2

Figure 10:
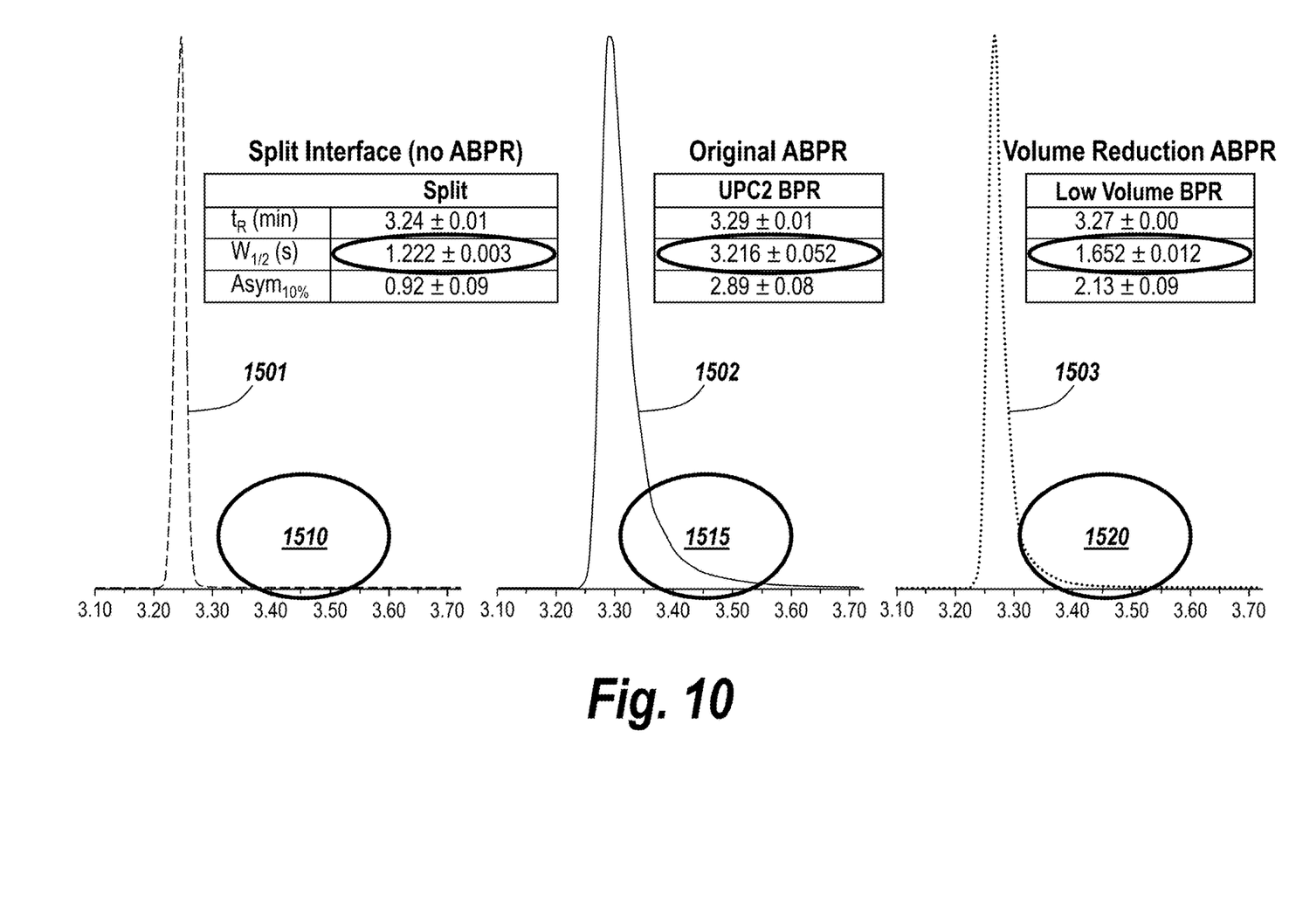
FIG. 10 provides three chromatograms showing band effects for various systems.

FIG. 10 shows a significant reduction in band distortion effects achieved using BPR 1400. FIG. 10 provides chromatograms for three various BPR designs and illustrates the effects on peak broadening and tailing. Trace 1501 is a peak measured from a sample that was not passed through a single flow path including both a back pressure regulator and a detector. That is, trace 1501 is a peak measured from a sample measured in a system having a split-flow interface design, where a make-up solvent is provided to the BPR and the detector is split from the flow line extending directly from the column. Since a sample that is associated with a split-interface design is not affected by the amount of unswept volume in a BPR, the sample associated with trace 1501 has not experienced any sample band spreading—see area 1510. Trace 1501 is sharp and symmetrical having a half width of about 1.22. Trace 1502 is a peak measured following the same method, except that the sample was passed through a back pressure regulator without the present technology (i.e., using the system shown in FIG. 8). That is, the back pressure regulator was standard commercial stock, that was not tailored to reduce internal volume and instead of a split-flow interface as was used for the sample provided in trace 1501, a BPR interface flow design where the BPR is positioned on the same flow path between the column and the detector. Trace 1502 shows a peak that is significantly broadened as compared to trace 1501 (compare half widths of 1.22 for trace 1501 to a half width of 3.22 for 1502), and which exhibits considerable tailing and some shouldering in area 1515. Trace 1503 is also a peak measured in a system using the BPR interface design but including, BPR 1400 (FIG. 9, and described in Example 1) configured with reduced internal volume according to the present technology. Trace 1503 is a sharp, symmetrical peak, more closely aligned to trace 1501 (compare half widths of 1.22 for trace 1501 to 1.65 for trace 1503) and with significantly less broadening and shouldering in area 1520 than in trace 1502.

Example 2 demonstrates embodiments of the present technology significantly reduces or eliminates band-broadening contributed by a back pressure regulator, permitting a separation quality on par with a separation performed in a split interface design. Thus, a user may achieve the advantages associated with a back pressure regulator, such as good pressure control with reasonable cost, and robust and wear-resistant operation, without sacrificing separation quality by implementing the methods, devices, and seats of the present technology.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

The invention claimed is:

1. A resilient seat for sealing surfaces in a pressurized system, the resilient seat comprising:
    a body defining a fluid flow path extending substantially axially between an inlet exterior sealing surface and an outlet exterior sealing surface, the body including an outer wall surface positioned between the inlet exterior sealing surface and the outlet exterior sealing surface;
    the inlet exterior sealing surface comprising a deformation member configured to deform outward from the inlet exterior sealing surface toward the outer wall surface and away from an interior of the fluid flow path when the resilient seat is axially compressed, wherein the deformation member comprises a flange extending outward from the inlet exterior sealing surface;
    the outlet exterior sealing surface comprising a sealing member configured to deflect inward from the outlet exterior sealing surface toward the fluid flow path when the resilient seat is axially compressed, wherein the sealing member comprises a chamfered edge extending from the body along the sealing member.

2. The resilient seat according to claim 1, wherein the inlet exterior sealing surface is configured to have less elastic deformation when the resilient seat is axially compressed than the outlet exterior sealing surface.

3. The resilient seat according to claim 1, wherein the flange has a rounded exterior contour.

4. The resilient seat according to claim 1, wherein the fluid flow path is sized and shaped to receive a needle for controlling pressure through the resilient seat.

5. The resilient seat according to claim 4, wherein interior walls defining the fluid flow path are configured to substantially match the profile of the needle.

6. The resilient seat according to claim 1, wherein the sealing member on the outlet exterior sealing surface comprises a face seal.

7. The resilient seat according to claim 1, wherein the outlet exterior sealing surface is configured to have greater elastic deformation when the resilient seat is axially compressed than the inlet exterior sealing surface.

8. The resilient seat according to claim 7, wherein a flange of material surrounds an outlet of the fluid flow path, the flange having an angled contour.

9. The resilient seat according to claim 7, wherein the outlet exterior sealing surface comprises a flange extending from the body.

10. The resilient seat according to claim 1, wherein side exterior surfaces of the body comprise one or more protrusions adapted to provide an interference fit with a housing.

11. The resilient seat according to claim 1, wherein side exterior surfaces of the body comprise one or more visual indicators adapted to aid placement of the resilient seat in a housing.

12. The resilient seat according to claim 4, wherein material forming the resilient seat has a lower elastic modulus than a needle material.

13. The resilient seat according to claim 10, wherein material forming the resilient seat has a lower elastic modulus than a housing material.

14. The resilient seat according to claim 1, wherein material forming the resilient seat has a lower elastic modulus than a head of the back pressure regulator.

* * * * *